No. 852,580. PATENTED MAY 7, 1907.
F. H. RUTHERFORD.
FLEXIBLE METALLIC PIPE.
APPLICATION FILED JUNE 13, 1906.

Witnesses:
Inventor:
Frank H. Rutherford
by Frank D. Thomason
Atty.

UNITED STATES PATENT OFFICE.

FRANK H. RUTHERFORD, OF CHICAGO, ILLINOIS.

FLEXIBLE METALLIC PIPE.

No. 852,580.        Specification of Letters Patent.        Patented May 7, 1907.

Application filed June 13, 1906. Serial No. 321,546.

*To all whom it may concern:*

Be it known that I, FRANK H. RUTHERFORD, a citizen of the United States, and a resident of Chicago, in the county of Cook and State of Illinois, have invented certain new and useful Improvements in Flexible Metallic Pipe, of which the following is a clear, full, and exact description.

The object of my invention is to provide a jointed metallic pipe, which can be applied to many uses, but is particularly useful as a substitute for the hose connections now in extensive use for air-brake couplings. My invention consists of a number of movably jointed pipe sections which can be easily moved into any position desired; which are not as liable to injury and destruction as said hose; are much more durable, and, considering their durability, much more economical. This I accomplish by the means hereinafter fully described, and as particularly pointed out in the claims.

Figure 1:
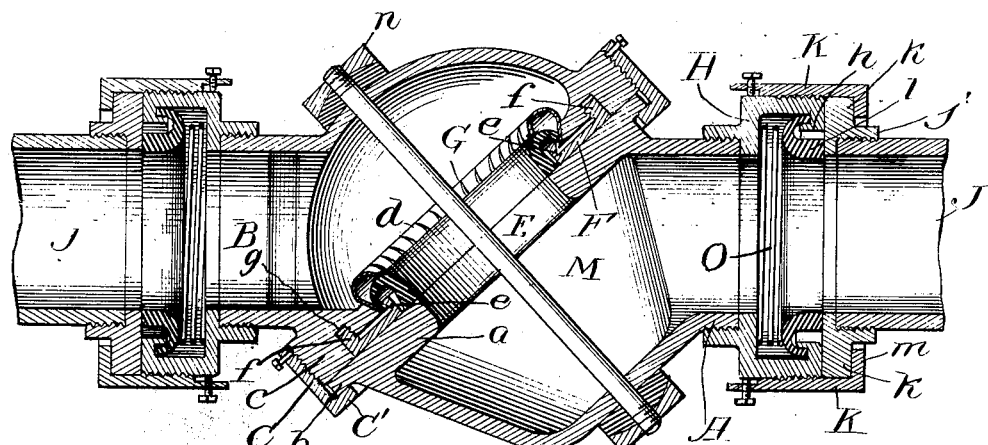
Figure 2:
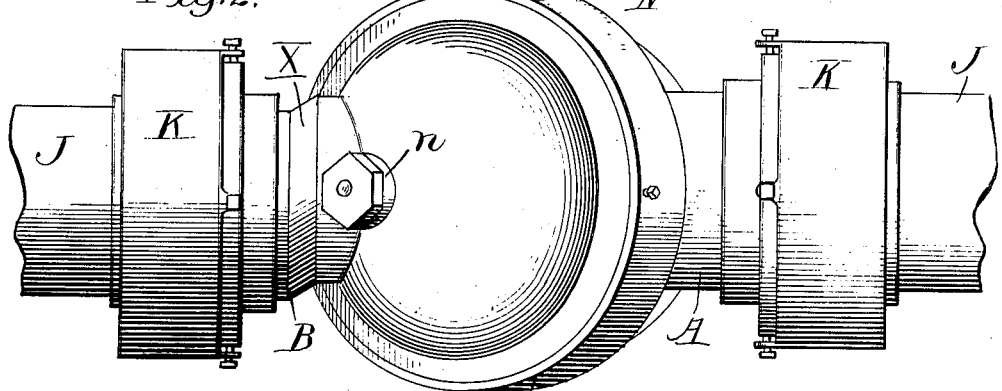
Figures 3, 4:
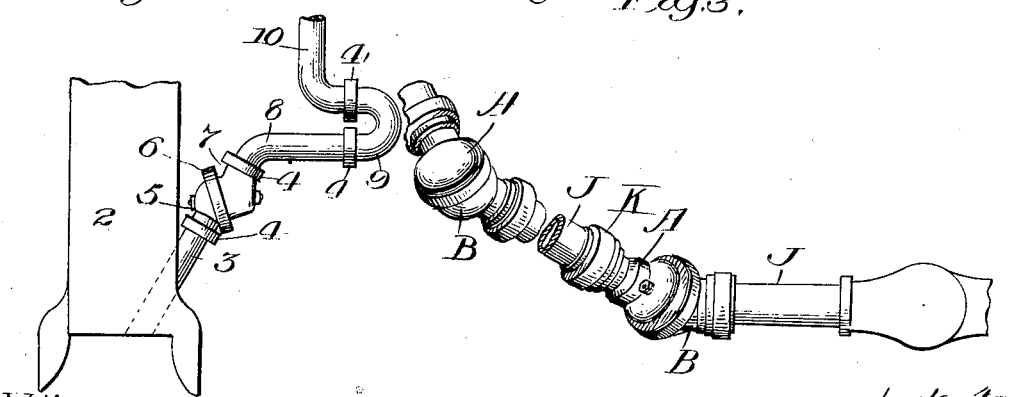

In the drawings:—Figure 1 is a longitudinal section of one of the joints of my invention. Fig. 2 is a plan view of the same drawn to a smaller scale. Fig. 3 is a plan view of a stretch of my improved pipe, used as a substitute for air-brake hose and drawn to a still smaller scale. Fig. 4 is a plan view of a portion of the same applied to an automatic air-brake coupler.

Referring to the drawings A represents one, and B the other of companion sections of pipe, which are jointed together in a plane of say, ninety degrees to the axis of the said sections, when they are in alinement. An oblique section of a cylindrical body, such as a pipe, would leave elliptical edges, so, in order to enable the contacting edges of the sections of my improved joint to rotatively engage each other, no matter at what angle the axes of the same may be arranged, I vault or bulge outward the side of said sections intersected by the axis of the joint, and widen the said vaulted portion, and provide the contacting edges of such widened vaulted portions of each section with inwardly and outwardly projecting flanges that are concentric with the axis of the joint. The inwardly projecting flange $a$ of section A is, preferably, thicker than the outer flange $b$ thereof, and the opening defined by the inner circular edge of said inner flange $a$, corresponds to or is slightly greater in diameter than the bore of the outer ends of said section. The outer circumference of the outer flange $c$ of section B corresponds to that of the flange $b$ of section A, and is screw-threaded. Screwed onto and inclosing flange $c$ is a ring C, one end of which is provided with an inwardly projecting circumferential flange C′, that is adapted to engage flange $b$, and, when the collar is screwed onto flange $c$, will tightly clamp section A to section B.

The inner flange $d$ of the section B does not project inward as far as flange $a$ of section A, and thus the circular opening made by its inner edge is greater than the opening surrounded by flange $a$. The inner edge of flange $d$ is, preferably, beveled, and the outer narrower edge of an inwardly progressing involute curved gasket or packing-ring E rests upon and is clamped to this beveled surface by means of an annulus F, in such manner as to make the inner thicker edge of the packing-ring bear upon the adjacent marginal portion of flange $a$. Said annulus F consists of a flat web extending in a plane at right angles to its axis, the inner circumference of which is provided with a lateral flange $e$, whose outer circumference is provided with an undercut bevel and engages the narrow outer edge of packing E, and is adapted to clamp it and hold it against the beveled inner edge of the flange $d$. The outer circumference of this annulus is also provided with a laterally projecting circumferential flange $f$, the inner circumference of which is screw-threaded, and is adapted to engage the screw-threaded inner circumference of a circumferential groove $g$, made in the opposing face of the thickened flanged contacting edge of section B. The construction of packing E, and the pressure of the air or steam in the pipes to which my invention is applied, is sufficient, ordinarily, to keep the packing bearing against the flange $a$ to prevent leakage. Should this, however, be found to be insufficient, I provide an involute annular spring G of thin metal, possessing sufficient elasticity so that when its outer circumferential edge is clamped with the narrower outer edge of the packing E between the flange $e$ of annulus F and the beveled inner circumference of the inner flange $d$ of section B, its inner slit edge will bear against the bend of the packing with sufficient pressure to prevent leakage under the packing-ring.

The opposite outer end of both sections A and B are provided with a transverse joint, which permits them to be revolved on the axis of the alining pipe to which they are connected. This joint comprises a bell-shaped collar H which is screwed onto the outer end of either section A or B. The annular edge of the mouth of this bell is provided with an inwardly projecting flange $h$, which is L-shaped in cross-section, to provide an annular seat between the inner circumference of the mouth of the bell and the parallel portion of flange $h$ for the reception of the narrower outer edge of the inwardly progressing involute packing or gasket I, the inner edge of which latter advances farther toward the connecting pipe J, and is adapted to bear against the inner edge of an annulus $j$ or ferrule screwed onto the adjacent screw-threaded end of the pipe J.

In order to increase the pressure of the inner annular edge of packing I against the ferrule, I have introduced a coil expansion-spring between the reduced portion of bell H and the bend of the packing, which effectually accomplishes this object. The ferrule $j$ is provided with an outwardly projecting flange $k$, and pipes J are secured to sections A or B, by means of a sleeve K, the inner screw-threaded portion of which engages the outer screw-threaded circumference of bell H, and the inwardly projecting flange $m$ at the opposite end of which catches back of flange $k$, and, when the sleeve is properly tightened, securely clamps pipe J and its ferrule to section A, in such manner as to permit the rotative movement of the latter on the former.

If desired sections A and B can be further secured to each other by means of a pivotal bolt M extending axially through the vaulted walls of said sections, which has cushioned nuts N, $n$, on its extended screw-threaded end. While desirable, these pivotal bolts may be dispensed with.

In operation, when it is proposed to bend my improved pipe, one section (either A or B) of the jointed portion, is rotated on the oblique axis of the joint while the other section is held stationary until the desired position is reached. If it is impossible to reach the exact position wished for by doing this, the obliquely jointed sections A and B are rotated on the axes of pipes J, J, so as to change the position of the plane of the meeting edges of the oblique joint, and then either said section A or B is rotated as stated.

It is possible to bend my improved pipe so as to make it describe any angle or curve desired, and to connect pipes or passages having parallel axes or axes arranged at angles to each other, as well as pipes having alining axes.

For the purpose of assisting in the manipulation of pipes J, J, and rendering it easier to rotate either of the sections on the axis of the oblique joint uniting them, I have offset one of said sections as at X, (Fig. 2), so that the axes of the stub ends A, B, and the pipes J, J, connected thereto, will not aline. This, as experience has demonstrated, very materially assists in rotating said stubs by providing a leverage, which is greater or less according to the extent of the offset, by means of which greater power can be exerted than where the application of manual effort is confined to a simple movement of the wrist.

In Fig. 4 of the drawings I show my invention applied to the automatic air-brake coupler 2 of railway cars. In this application the coupling-head is provided on one side with a stub 3 projecting obliquely to the rear therefrom. The rear end of this stub has a transverse pivotal joint 4 connecting it to the adjacent stub 5 of the oblique joint 6, and the opposite stub 7 of this oblique joint 6 is connected to the adjacent bent end of a pipe 8 by a transverse joint 4. Joints 4 are constructed substantially the same as the transverse joints, inclosed and connected by the sleeve K, as shown in Fig. 1 of the drawings, and the oblique joint 6 is likewise constructed substantially the same as the oblique joints shown in said Fig. 1 of the drawings. The end of pipe 8 farthest from the oblique section 6 has a return bend 9 connected thereto by a transverse joint 4, and the opposite end of this bend 9 is connected by the same kind of a transverse joint 4, to the bent end of the line-pipe 10 of the air-brake system of the car. This method of connecting the pipe 10 to the coupling 2, permits the coupling to move into any position into which its use is likely to bring it.

In Fig. 3 of the drawings I show my improved invention used as a substitute for an ordinary air-brake hose-coupling. In this relation it is not subject nor liable to injury by means which frequently destroy the utility of the ordinary hose-coupling entirely, and it is not subject to physical deterioration as are hose couplings of rubber and textile fabrics.

What I claim as new is:—

1. A flexible metallic pipe comprising two or more connected sections, one of which is divided mediate its ends in a plane oblique to its axis to form a joint the engaging edges of which are each provided with an inwardly projecting flange the inner edges of each of which are concentric to the axis of the joint, and are of different diameters in respect to each other, a packing suitably secured to the flange the diameter of whose edge is greater, and pressing against the margins of the inner edge of the flange the diameter of whose edge is smaller, and means interposed between said flanges for securing said packing to the first mentioned flange.

2. A flexible metallic pipe comprising two or more connected sections, one of which is divided mediate its ends in a plane oblique to its axis to form a joint the engaging edges of which are each provided with an inwardly projecting flange the inner edges of each of which are concentric to the axis of the joint, and are of different diameters in respect to each other, an inwardly progressing involute curved packing suitably secured in the flange the diameter of whose edges is greater, and pressing against the margins of the inner edge of the flange the diameter of whose edge is smaller.

3. A flexible metallic pipe comprising two or more connected sections, one of which is divided mediate its ends in a plane oblique to its axis to form a joint the engaging edges of which are each provided with an inwardly projecting flange the inner edges of each of which are concentric to the axis of the joint, and are of different diameters in respect to each other, an inwardly progressing involute curved packing suitably secured in the flange the diameter of whose edges is greater, and pressing against the margins of the inner edge of the flange the diameter of whose edges is smaller and a spring engaging and pressing upon said packing.

4. A flexible metallic pipe comprising two or more connected sections, one of which is divided mediate its ends in a plane oblique to its axis to form a joint the engaging edges of which are each provided with an inwardly projecting flange the inner edges of each of which are concentric to the axis of the joint, and are of different diameters in respect to each other, an inwardly progressing involute curved packing suitably secured in the flange the diameter of whose edges is greater, and pressing against the margins of the inner edge of the flange the diameter of whose edges is smaller and an inwardly progressing involute spring engaging and pressing upon said packing.

5. A flexible metallic pipe comprising two or more connected sections, one of which is divided mediate its ends in a plane oblique to its axis to form a joint the engaging edges of which are each provided with an inwardly projecting flange the inner edges of each of which are concentric to the axis of the joint, and are of different diameters in respect to each other, an inwardly progressing involute curved packing suitably secured in the flange the diameter of whose edges is greater, and pressing against the margins of the inner edge of the flange the diameter of whose edges is smaller and an inwardly progressing involute spring having its inner edge slit and engaging and pressing upon said packing.

6. A flexible metallic pipe one section of which has a portion thereof offset and has the other portion jointed to the opposite section of said pipe in a plane oblique to the axis of the same.

7. A flexible metallic pipe consisting of several sections pivotally jointed to each other in transverse planes, one of said sections consisting of two parts, the meeting edges of which are pivotally jointed together in a plane oblique to the axis of the parts where they are jointed, and one of said parts having the end thereof opposite said joint offset.

8. A flexible metallic pipe comprising two or more connected sections, one of which is pivotally connected at one end to its companion section in a transverse plane, and mediate its ends is divided in a plane into two parts and the edges resulting from such division pivotally connected together and one of said parts having its longitudinal axis offset.

In testimony whereof I have hereunto set my hand and seal this 2d day of June, A. D., 1906.

FRANK H. RUTHERFORD. [L. S.]

Witnesses:
  FRANK D. THOMASON,
  E. K. LUNDY.